United States Patent
Ekambaram et al.

(10) Patent No.: US 10,241,891 B2
(45) Date of Patent: Mar. 26, 2019

(54) DYNAMIC RANKING OF PERFORMANCE ISSUES FOR APPLICATIONS

(71) Applicant: International Business Machines Corporation, Armonk, NY (US)

(72) Inventors: Vijay Ekambaram, Chennai (IN); Sachidanand Mangala Basavanna, Bangalore (IN); Ashish K. Mathur, Bangalore (IN); Nitendra Rajput, Gurgaon (IN); Vivek Sharma, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 142 days.

(21) Appl. No.: 14/754,092

(22) Filed: Jun. 29, 2015

(65) Prior Publication Data

US 2016/0378648 A1    Dec. 29, 2016

(51) Int. Cl.
G06F 11/36    (2006.01)
G06F 11/00    (2006.01)

(52) U.S. Cl.
CPC .......... *G06F 11/3612* (2013.01); *G06F 11/00* (2013.01); *G06F 11/3616* (2013.01); *G06F 11/3664* (2013.01); *G06F 11/3684* (2013.01); *G06F 11/3688* (2013.01); *G06F 11/3692* (2013.01); *G06F 11/366* (2013.01)

(58) Field of Classification Search
CPC .............. G06F 11/366; G06F 11/3656; G06F 11/3612; G06F 11/3616; G06F 11/3604; G06F 2201/86; G06F 2201/865; G05B 23/0278; G05B 23/2081; G05B 23/2075
See application file for complete search history.

(56) References Cited

U.S. PATENT DOCUMENTS

| | | | | |
|---|---|---|---|---|
| 5,847,972 A * | 12/1998 | Eick | ...................... | G06F 11/323 345/440 |
| 6,789,257 B1 * | 9/2004 | MacPhail | ............ | G06F 11/0709 709/223 |
| 8,782,613 B2 | 7/2014 | Hines | | |
| 2005/0066241 A1 * | 3/2005 | Gross | ................. | G05B 23/0283 714/48 |
| 2005/0262484 A1 * | 11/2005 | Glerum | ............... | G06F 11/3688 717/130 |
| 2006/0053422 A1 * | 3/2006 | Alikacem | ........... | G06F 11/3668 718/100 |
| 2006/0156077 A1 * | 7/2006 | Altaf | ................... | G06F 11/0775 714/57 |
| 2008/0195369 A1 * | 8/2008 | Duyanovich | ....... | G06F 11/0709 703/22 |

(Continued)

OTHER PUBLICATIONS

Abogharaf et al., "A Methodology for Energy Performance Testing of Smartphone Application", © 2012 IEEE, Jun. 2-3, 2012, pp. 110-116.

(Continued)

*Primary Examiner* — Joseph O Schell

(74) *Attorney, Agent, or Firm* — Gilbert Harmon, Jr.

(57) ABSTRACT

Identification and dynamic ranking of performance issues. For an instance of a performance anti-pattern, identifying and recording information relating to a resultant performance issue, quantifying the magnitude of the performance issue, and dynamically ranking the performance issue against other performance issues.

20 Claims, 3 Drawing Sheets

(56) References Cited

U.S. PATENT DOCUMENTS

2012/0158364 A1    6/2012   Luchi et al.
2014/0165204 A1    6/2014   Williams et al.

OTHER PUBLICATIONS

Gaber, "Dyna Trace: Browser Performance Analysis", Jun. 13, 2013, pp. 1-12, <http://www.slideshare.net/yasminegaber/dyna-trace>.

Mizouni et al., "Performance Evaluation of Mobile Web Services", © 2011 IEEE, 2011 Ninth IEEE European Conference on Web Services, pp. 184-191.

Ravindranath et al., "AppInsight: Mobile App Performance Monitoring in the Wild", Proceedings of the 10th USENIX conference on Operating Systems Design and Implementation, OSDI'12, published Oct. 8, 2012, pp. 107-120, USENIX Association, 2012.

Taft, "Dynatrace Launches Synthetic Monitoring Engine", Oct. 10, 2014, pp. 1-2, <http://www.eweek.com/developer/dynatrace-launches-synthetic-monitoring-engine.html>.

Thiagarajan et al., "Who Killed My Battery: Analyzing Mobile Browser Energy Consumption", WWW 2012—Session: Mobile Web Performance, Apr. 16-20, 2012, ACM 978-1-4503-1229-5/12/04, pp. 41-50.

Thompson et al.; "Optimizing Mobile Application Performance with Model-Driven Engineering", SEUS '09 Proceedings of the 7th IFIP WG 10.2 International Workshop on Software Technologies for Embedded and Ubiquitous Systems, published Nov. 11, 2009, pp. 1-12.

"Akamai", © 2015 Akamai Technologies, Mar. 30, 2015, 1 page, <www.akamai.com/>.

"AT&T Application Resource Optimizer (ARO)", © 2015 AT&T Intellectual Property, printed Apr. 2, 2015, pp. 1-2, <http://developer.att.com/application-resource-optimizer>.

"DynaTrace Integration", Compuware, printed Apr. 2, 2015, 1 page, <http://www.neotys.com/documents/doc/neoland/latest/en/html/6153.htm>.

"Little Eye Labs", © 2014 Liberty Acquisition Sub II, LLC., printed Apr. 2, 2015, pp. 1-4, <http://www.littleeye.co/>.

"Load Testing with NeoLoad and dynaTrace", © 2005-2015 Neotys USA, Inc., printed Apr. 2, 2015, pp. 1-2, <http://www.neotys.com/product/technologies-dynatrace-load-testing.html>.

"Network Virtualization", © 2015 Hewlett-Packard Development Company, L.P., printed Apr. 7, 2015, pp. 1-9, <http://www8.hp.com/us/en/software-solutions/network-virtualization/index.html>.

"SOASTA named Magic Quadrant Leader", © 2015 SOASTA, printed Apr. 2, 2015, pp. 1-3, <http://www.soasta.com/>.

Ekambaram et al., "Dynamic Ranking of Performance Issues for Applications", USPTO U.S. Appl. No. 15/410,029, filed on Jan. 19, 2017, 35 pages.

IBM, Appendix P, List of IBM Patents or Patent Applications Treated as Related, dated Jan. 19, 2017, 2 pages.

\* cited by examiner

DYNAMIC RANKING OF PERFORMANCE ISSUES FOR APPLICATIONS

BACKGROUND

The present invention relates generally to the field of data processing, and more particularly to performance monitoring.

A code snippet is a segment of code that is recycled by a programmer to save time in writing a new application (sometimes referred to as a program). An anti-pattern (sometimes referred to as a performance anti-pattern) is a code snippet that introduces a set of performance issues (sometimes referred to as performance impacts or resultant impacts) to the processing of the application. These performance issues range from critical errors to minor delays. Performance issues include, but are not limited to: an application freezing; a processing delay; and/or an unresponsive application. Performance issues impact a user's ability to use an application.

SUMMARY

According to an aspect of the present invention, there is a method, computer program product, and/or system that performs the following steps (not necessarily in the following order): (i) identifying a set of anti-patterns in an application binary code; (ii) creating a set of reports to describe a set of performance impacts caused by the set of anti-patterns; and (iii) ranking the set of anti-patterns based, at least in part, on a subset of the set of performance impacts. At least the ranking step is performed by computer software running on computer hardware.

DETAILED DESCRIPTION

Figure 1:
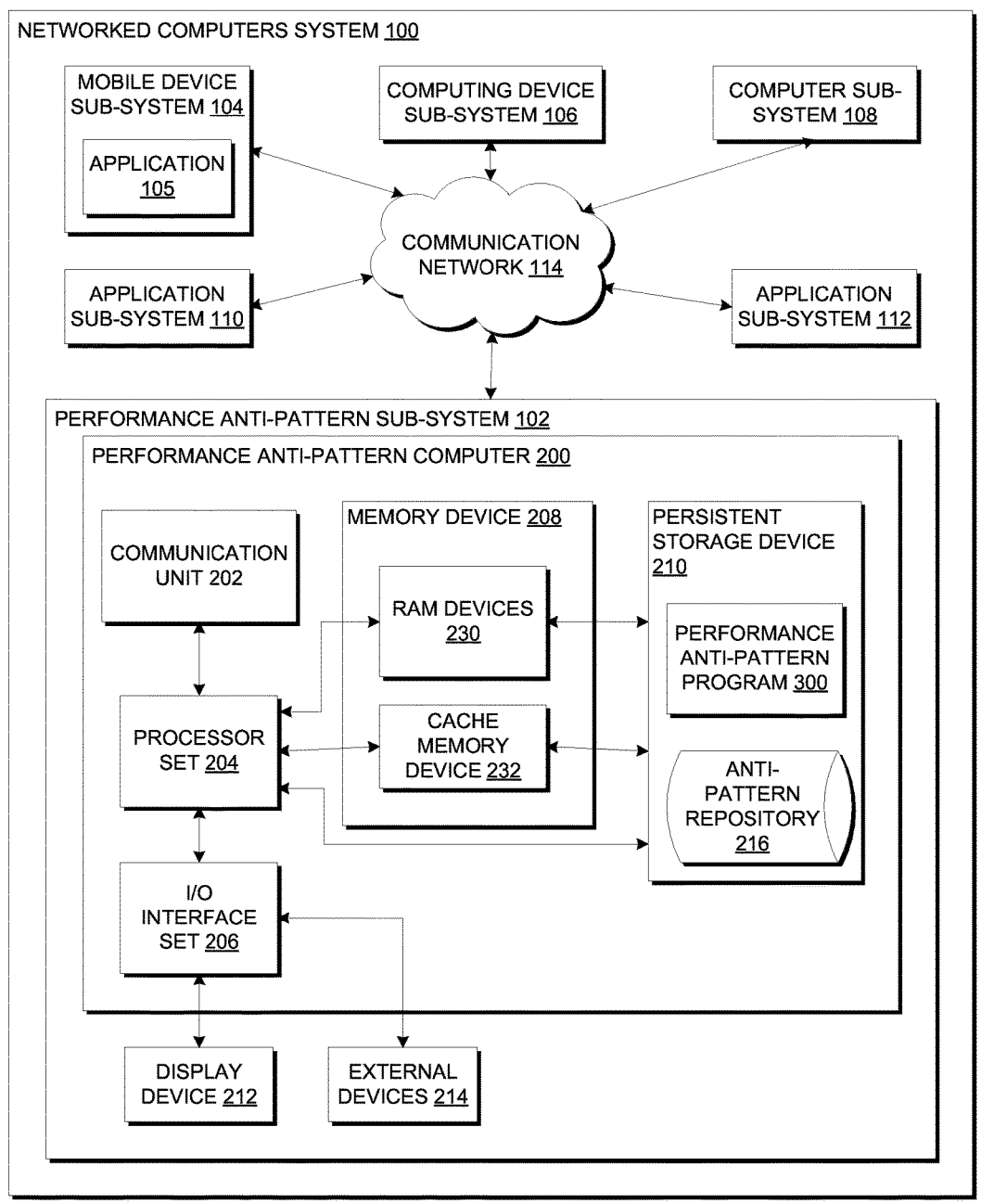
FIG. 1 is a block diagram view of a first embodiment of a system according to the present invention.

Identification and dynamic ranking of performance issues. For an instance of a performance anti-pattern, identifying and recording information relating to a resultant performance issue, quantifying the magnitude of the performance issue, and dynamically ranking the performance issue against other performance issues. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: performance anti-pattern sub-system 102; mobile device sub-system 104; application 105; computing device sub-system 106; computer sub-system 108; application sub-systems 110, 112; communication network 114; performance anti-pattern computer 200; communication unit 202; processor set 204; input/output (I/O) interface set 206; memory device 208; persistent storage device 210; display device 212; external devices 214; anti-pattern repository 216; random access memory (RAM) devices 230; cache memory device 232; and performance anti-pattern program 300.

Performance anti-pattern sub-system 102 is, in many respects, representative of the various computer sub-system(s) in the present invention. Accordingly, several portions of performance anti-pattern sub-system 102 will now be discussed in the following paragraphs.

Performance anti-pattern sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Performance anti-pattern program 300 is a collection of machine readable instructions and/or data that is used to create, manage and control certain software functions that will be discussed in detail, below, in the Example Embodiment sub-section of this Detailed Description section.

Performance anti-pattern sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Performance anti-pattern sub-system 102 is shown as a block diagram with many double arrows. These double arrows (no separate reference numerals) represent a communications fabric, which provides communications between various components of performance anti-pattern sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for performance anti-pattern sub-system 102; and/or (ii) devices external to performance anti-pattern sub-system 102 may be able to provide memory for performance anti-pattern sub-system 102.

Performance anti-pattern program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Performance anti-pattern program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communication unit 202, in these examples, provides for communications with other data processing systems or devices external to performance anti-pattern sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with performance anti-pattern computer 200. For example, I/O interface set 206 provides a connection to external devices 214. External devices 214 will typically include devices such as a keyboard, a keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, performance anti-pattern program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
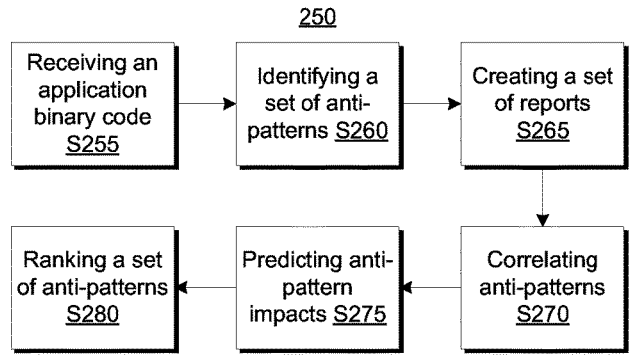
FIG. 2 is a flowchart showing a first embodiment method performed, at least in part, by the first embodiment system.
Figure 3:
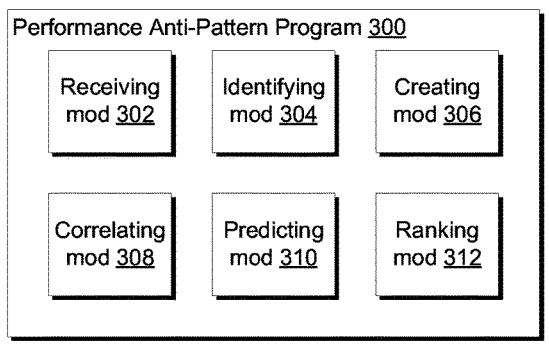
FIG. 3 is a block diagram view of a machine logic (for example, software) portion of the first embodiment system.

FIG. 2 shows flowchart 250 depicting a method according to the present invention. FIG. 3 shows performance anti-pattern program 300, which performs at least some of the method steps of flowchart 250. This method and associated software will now be discussed, over the course of the following paragraphs, with extensive reference to FIG. 2 (for the method step blocks) and FIG. 3 (for the software blocks). In this example performance anti-pattern sub-system 102 analyzes application 105 from mobile device sub-system 104 (FIG. 1).

Processing begins at step S255, where receiving module ("mod") 302 receives an application binary code. In some embodiments of the present invention, receiving mod 302 receives an application binary code (not shown) from mobile device sub-system 104, such as for application 105 (FIG. 1). In some embodiments of the present invention, receiving mod 302 receives an application binary code by accessing the application binary code on mobile device sub-system 104 over a network, such as communication network 114 (FIG. 1). In some embodiments of the present invention, an application (not shown) is run on computing device 106 (FIG. 1). In some embodiments of the present invention, an application (not shown) is run on computer sub-system 108 (FIG. 1). In some embodiments of the present invention, an application binary code is a machine language representation of an application. In this example, receiving mod 302 receives the binary code of application 105 from mobile device sub-system 104 over communication network 114.

Processing proceeds to step S260, where identifying mod 304 identifies a set of anti-patterns. In some embodiments of the present invention, an anti-pattern (sometimes called a performance anti-pattern) is a code snippet. In some embodiments of the present invention, an anti-pattern is a code snippet that introduces a set of performance issues (sometimes referred to as performance impacts or resultant impacts) to the processing of the application. In some embodiments of the present invention, an anti-pattern is, but is not limited to, one of the following types: (i) busy application widget; (ii) ignore screen size; (iii) user interface main thread; (iv) memory release absent; (v) sleeping widget update; (vi) context switching; (vii) background-foreground; (viii) mutable statistic; (ix) radio inexact; (x) permissionless wireless; (xi) service leak; (xii) image not scaling; (xiii) data transfer; (xiv) deep layouts; (xv) background control; (xvi) boot time services; (xvii) sieve leak; and/or (xviii) non-multitasking. In some embodiments of the present invention, an anti-pattern is categorized as one or more of, but is not limited to: (i) memory anti-patterns; (ii) CPU anti-patterns; (iii) battery anti-patterns; and/or (iv) security anti-patterns.

In some embodiments of the present invention, identifying mod 304 compares sections of application binary code against a repository of performance anti-patterns. In some embodiments of the present invention, identifying mod 304 periodically updates a set of anti-pattern definitions. In some embodiments of the present invention, a set of known anti-patterns are stored in anti-pattern repository 216 (FIG. 1). In some embodiments of the present invention, a segment of application binary code is part of a plurality of anti-patterns. In some embodiments of the present invention, a performance anti-pattern relates to one or more of the following systems: (i) memory; (ii) CPU; (iii) power supply;

(iv) battery; (v) security; and/or (vi) other systems. In some embodiments of the present invention, an application binary code contains only one type of performance anti-pattern. In some embodiments of the present invention, an application binary code contains more than one type of performance anti-pattern. In this example, identifying mod 304 identifies three performance anti-patterns in application 105: two memory anti-patterns; and one security anti-pattern.

Processing proceeds to step S265, where creating mod 306 creates a set of reports about the set of anti-patterns. In some embodiments of the present invention, creating mod 306 executes the application binary code to create a set of reports. In some embodiments of the present invention, creating mod 306 creates a time log. In some embodiments of the present invention, a time log records a time at which a performance anti-pattern is executed. In some embodiments of the present invention, creating mod 306 creates a performance report. In some embodiments of the present invention, a performance report measures the usage of various computer components by the application binary code. In some embodiments of the present invention, a performance report measures a usage capacity percentage for the use of various computer components (e.g., the percentage of CPU processing utilized by the application). In some embodiments of the present invention, a performance report is a resource capture report. In some embodiments of the present invention, a resource capture report relates to a resource, such as, but not limited to: (i) CPU; (ii) RAM; (iii) battery; and/or (iv) virtual memory. In some embodiments of the present invention, the set of reports created for performance anti-patterns varies depending on the type of performance anti-pattern being analyzed.

In some embodiments of the present invention, a set of performance issues (sometimes referred to a performance impacts or resultant impacts) are identified based on the set of reports. In some embodiments of the present invention, a resultant impact is associated with an anti-pattern. In some embodiments of the present invention, a resultant impact is an adverse effect on the operation of a computing device that occurs due to the execution of an anti-pattern. In some embodiments of the present invention, a single anti-pattern is associated with more than one resultant impact. In some embodiments of the present invention, the type of performance anti-pattern is determined in step S265, instead of in step S260. In this example, reports are created for each of the three anti-patterns. For each of the two memory anti-patterns, a time log and a performance report are created. For the security anti-pattern, a time log is created.

Processing proceeds to step S270, where correlating mod 308 correlates a set of anti-patterns to a set of resultant impacts. In some embodiments of the present invention, the resultant impact of an anti-pattern is a performance issue in the processing of an application binary code. In some embodiments of the present invention, the resultant impact of an anti-pattern relates to improper accessibility of information in the application. In some embodiments of the present invention, a resultant impact is identified in step S270, instead of step S265. In some embodiments of the present invention, correlating a set of performance anti-patterns to a set of resultant impacts maps occurrences of a set of performance anti-patterns to a set of resultant impacts. In some embodiments of the present invention, correlating mod 308 creates a graphical display of the correlation of the set of anti-patterns and the set of resultant impacts. In some embodiments of the present invention, correlating mod 308 creates a graphical display showing a timeline of resultant impacts. In some embodiments of the present invention, a graphical display indicates a set of resultant impacts as a function of time. In some embodiments of the present invention, a graphical display indicates resource usage as a function of time. In this example, a performance issue results from each of the memory anti-patterns. However, a performance issue does not result from the security anti-pattern. The resultant impact of each memory anti-pattern is a performance issue wherein processor usage spikes for fifty milliseconds. The resultant impact of the security anti-pattern is improper access to sensitive user information, but is not executed at a specified time.

Processing proceeds to step S275, where predicting mod 310 predicts a set of resultant impacts for a set of anti-patterns. In some embodiments of the present invention, predicting mod 310 employs crowdsourcing to predict a resultant impact for a set of future anti-patterns. In some embodiments of the present invention, crowdsourcing includes utilizing analysis from various embodiments of the present invention to make a probabilistic determination of the set of anti-patterns. In some embodiments of the present invention, predicting mod 310 applies statistical analysis to determine a set of resultant impacts for a set of anti-patterns. In some embodiments of the present invention, predicting mod 310 employs pattern recognition techniques to determine a set of resultant impacts for a set of anti-patterns. In some embodiments of the present invention, predicting mod 310 analyzes correlated information from correlating mod 308. In some embodiments of the present invention, predicting mod 310 recursively improves predictions based on earlier predictions. In some embodiments of the present invention, predicting mod 310 learns from earlier predictions. In some embodiments of the present invention, predicting mod 310 analyzes actual results of earlier anti-patterns in light of earlier predictions made. In some embodiments of the present invention, predicting mod 310 uses results of the same performance anti-patterns in various application binary codes to predict the resultant impact of current performance anti-patterns. In this example, the predicted results of the three performance anti-patterns are: (i) the security anti-pattern results in a major security breach exposing a user password and credit card information; (ii) the first memory anti-pattern results in a minor processor spike for a short period of time; (iii) the second memory anti-pattern results in a moderate processor spike for a short period of time.

Processing terminates at step S280, where ranking mod 312 ranks the set of anti-patterns. In some embodiments of the present invention, ranking mod 312 ranks the set of anti-patterns based on a resultant impact. In some embodiments of the present invention, ranking mod 312 ranks the set of anti-patterns based on a predicted resultant impact. In some embodiments of the present invention, ranking mod 312 ranks the set of performance anti-patterns based on a quantitative resultant impact. In some embodiments of the present invention, ranking mod 312 ranks the set of anti-patterns based on a predicted quantitative resultant impact. In some embodiments of the present invention, ranking mod 312 ranks the set of anti-patterns based on a qualitative resultant impact. In some embodiments of the present invention, ranking mod 312 ranks the set of anti-patterns based on a predicted qualitative resultant impact. In some embodiments of the present invention, ranking mod 312 ranks the set of anti-patterns against one another. In some embodiments of the present invention, ranking mod 312 ranks the set of anti-patterns into a set of tiers. In some embodiments of the present invention, ranking mod 312 ranks the set of anti-patterns based on the underlying type of anti-pattern. In this example, the security anti-pattern is ranked as the most important, the first memory anti-pattern is ranked as the least important, and the second memory anti-pattern is ranked as the second most important.

III. Further Comments and/or Embodiments

Some embodiments of the present invention recognize the following facts, potential problems, and/or potential areas for improvement with respect to the current state of the art: (i) performance testing is an important step in the development process of a mobile application; (ii) performance anti-patterns affect memory, responsiveness, networking, and power, among other systems; (iii) performance anti-patterns appear in a variety of types, including, but not limited to, service leaks, lack of background multitasking, and failure to adjust power settings on features not in use.

Some embodiments of the present invention include predicting a quantitative performance impact for a set of performance anti-patterns and dynamic ranking of performance issues. In some embodiments of the present invention, the set of performance anti-patterns are identified through code analysis. In some embodiments of the present invention, a set of resultant impacts corresponding to the set of performance anti-patterns are dynamically ranked using a predicted quantitative resultant impact.

In some embodiments of the present invention, dynamic ranking of the set of performance issues corresponding to the set of anti-patterns uses one or more of: (i) applying static analysis or runtime analysis to a binary code of an application to detect performance anti-patterns; (ii) identifying a set of anti-patterns corresponding to a set of known anti-patterns; (iii) logging a set of time stamps when the set of anti-patterns are executed during test-case execution; (iv) monitoring a set of performance metrics for the application; (v) generating a performance test report during test-case execution of an application; (vi) correlating the set of time stamps with the performance test report, such that each performance issue reported in the performance report is mapped with the identified anti-pattern; (vii) classifying the obtained correlated data as one of "on-effect," "post-effect," or "pre-effect"; (viii) determining, over multiple implementations, a set of common occurrences among the set of performance anti-patterns that indicate a relationship among a subset of the set of performance anti-patterns and/or that indicate a quantitative performance impact due to the interrelationship of the set of performance anti-patterns; (ix) eliminating false positive results; (x) predicting the quantitative performance impact of a set of performance issues; and/or (xi) dynamically ranking the set of performance issues.

In some embodiments of the present invention, a performance report is generated for each performance anti-pattern. In some embodiments of the present invention, the report includes designations of the importance of the performance anti-pattern. In some embodiments of the present invention, the performance report is visually represented. In some embodiments of the present invention, the designations are color coded. In some embodiments of the present invention, the report includes a set of categories, including, but not limited to: (i) the affected components; (ii) the name of the performance anti-pattern; (iii) a segment of code responsible for the performance anti-pattern; (iv) a set of performance issues caused by the performance anti-pattern. (v) the reason for the performance anti-pattern; and/or (vi) a recommendation to resolve the performance anti-pattern.

Figure 4:
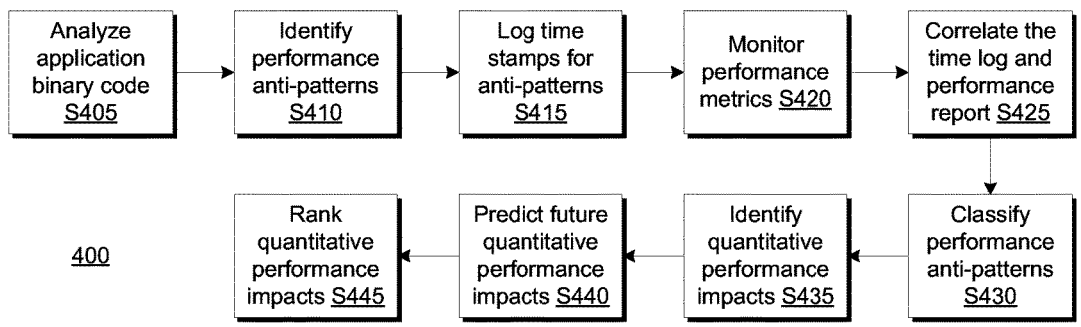
FIG. 4 is a flowchart showing a second embodiment method according to the present invention.

FIG. 4 shows flowchart 400 depicting a method according to the present invention. In this example, a binary code is analyzed for the impact of performance anti-patterns.

Processing begins at step S405, where a performance anti-pattern sub-system analyzes an application binary code to detect a performance anti-pattern. In some embodiments of the present invention, an application binary code is analyzed for a set of known anti-patterns. In some embodiments of the present invention, an application binary code must be converted from an application code in a non-binary format.

Processing proceeds to step S410, where a performance anti-pattern sub-system identifies a set of performance anti-patterns. In some embodiments of the present invention, a performance anti-pattern sub-system maintains a repository of known performance anti-patterns. In some embodiments of the present invention, the performance anti-pattern sub-system compares the detected performance anti-patterns to a set of performance anti-patterns in a repository. In some embodiments of the present invention, identifying a performance anti-pattern includes identifying a type of performance anti-pattern.

Processing proceeds to step S415, where a performance anti-pattern sub-system creates a time log. In some embodiments of the present invention, a performance anti-pattern sub-system logs a time at which a performance anti-pattern is executed. In some embodiments of the present invention, a performance anti-pattern is executed more than once and is recorded in the time log more than once. In some embodiments of the present invention, the time log does not record some types of performance anti-pattern.

Processing proceeds to step S420, where a performance anti-pattern sub-system generates a performance test report based on a set of performance metrics of the application. In some embodiments of the present invention, a performance test report includes information about system usage. In some embodiments of the present invention, information about system usage includes, but is not limited to: (i) CPU percentage usage; (ii) memory usage; (iii) storage usage; (iv) battery life; (v) battery usage; (vi) power usage; (vii) security leaks; (viii) display usage; (ix) network usage; (x) virtual memory; (xi) rendering delay; (xii) page load delay; (xiii) request delay; and/or (xiii) response delay. In some embodiments of the present invention, the performance test report includes a time stamp. In some embodiments of the present invention, the performance test report includes details of testing performed on the application binary code. In some embodiments of the present invention, the performance test report includes, but is not limited to: (i) a set of tests performed on the application binary code; (ii) a description of the set of tests performed; (iii) a success or failure of the set of tests performed; (iv) a graphical display of the data traffic generated by the set of tests performed; (v) an interactive graphical display; and/or (vi) details of anti-patterns discovered during the set of tests performed.

Processing proceeds to step S425, where a performance anti-pattern sub-system correlates the time log and the performance test report. In some embodiments of the present invention, a performance anti-pattern sub-system maps the performance test report with the time log. In some embodiments of the present invention, a performance anti-pattern sub-system creates a graphical display of the correlation between the time log and the performance test report.

Processing proceeds to step S430, where a performance anti-pattern sub-system classifies each performance anti-pattern. In some embodiments of the present invention, a performance anti-pattern is one of: (i) on-effect; (ii) post-effect; or (iii) pre-effect. In some embodiments of the present invention, an on-effect performance anti-pattern results in a performance impact at the time the performance anti-pattern is executed. In some embodiments of the present invention, a post-effect performance anti-pattern results in a performance impact after the time the performance anti-pattern is executed. In some embodiments of the present invention, a pre-effect performance anti-pattern results in a performance impact prior to the time the performance anti-pattern is executed.

Processing proceeds to step S435, where a performance anti-pattern sub-system identifies a quantitative performance impact for each performance anti-pattern. In some embodiments of the present invention, a performance anti-pattern does not have a quantitative performance impact and step S435 is omitted. In some embodiments of the present invention, a quantitative performance impact relates to a system usage identified in step S420.

Processing proceeds to step S440, where a performance anti-pattern sub-system predicts a future quantitative performance impact of a future instance of each performance anti-pattern. In some embodiments of the present invention, predicting a future quantitative performance impact includes a crowdsourcing. In some embodiments of the present invention, crowdsourcing includes receiving reports from a set of other users using various embodiments of the present invention, those reports detailing usages and errors. In some embodiments of the present invention, predicting future quantitative performance impacts includes analyzing prior instances of performance anti-patterns.

Processing proceeds to step S445, where a performance anti-pattern sub-system ranks each performance anti-pattern based on the quantitative performance impact of that performance anti-pattern. In some embodiments of the present inventions, the performance anti-patterns are ranked based on a set of preferences received by the performance anti-pattern sub-system. In some embodiments of the present invention, the ranking of performance impacts is dynamically updated.

Figure 5:
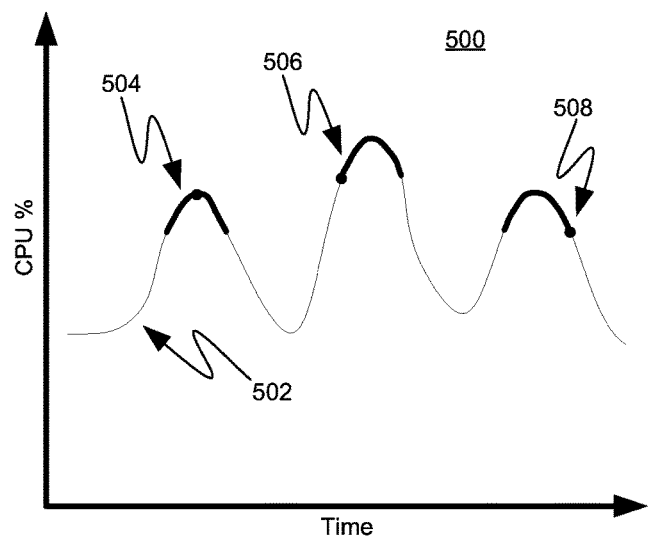
FIG. 5 is a graphical display environment produced according to an embodiment of the present invention.

FIG. 5 shows graphical display 500 produced by an embodiment of the present invention. Graphical display 500 shows a graph of central processing unit (CPU) usage percentage (CPU %) over time. Graphical display 500 includes a visualization of the performance of an application over time, represented by application performance 502. Spikes in CPU % represent performance issues. The performance issues are represented by darker segments along application performance 502. Application performance 502 includes performance issues 504, 506, and 508. Each performance issue is associated with a performance anti-pattern, represented by a point along application performance 502. For performance issue 504, the performance anti-pattern occurs at the CPU % peak. This performance anti-pattern is classified as "on-effect," meaning the performance issue occurs "on" or at the same time as the execution of the anti-pattern. For performance issue 506, the performance anti-pattern occurs before the CPU % peak. This performance anti-pattern is classified as "post-effect," meaning the performance issue occurs "post" or after the execution of the performance anti-pattern. For performance issue 508, the performance anti-pattern occurs after the CPU % peak. This performance anti-pattern is classified as "pre-effect," meaning the performance issue occurs "pre" or before the execution of the performance anti-pattern.

Figure 6:
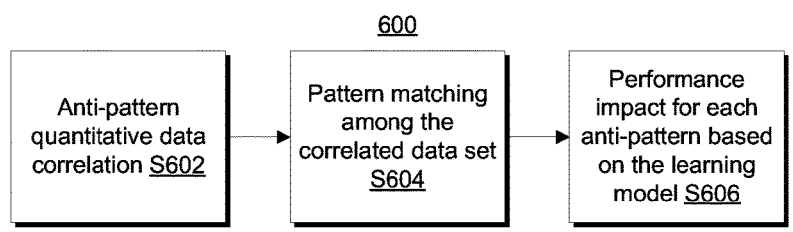
FIG. 6 is a flowchart showing a third embodiment method performed according to the present invention.

FIG. 6 shows flowchart 600 depicting a method of server learning according to the present invention. In this example, server learning involves comparing and correlating a set of quantitative data (a set of critical areas) with the performance anti-pattern and identifying the same pattern in other cases from a crowdsourced data set. In some embodiments of the present invention, flowchart 600 is repeated for various embodiments of the present invention and the results are combined to create a more confident model. Further, server learning involves computing a performance impact of each performance anti-pattern.

Processing starts at step S602, where a performance anti-pattern sub-system performs an anti-pattern quantitative data correlation. In some embodiments of the present invention, the anti-pattern quantitative data is received from a set of users. In some embodiments of the present invention, a performance anti-pattern sub-system transmits a program on client devices to report performance anti-patterns encountered and/or to report performance issues. In some embodiments of the present invention, a set of anti-patterns are classified (as "on-effect," "post-effect," or "pre-effect").

Processing proceeds to step S604, where a performance anti-pattern sub-system performs pattern matching among the correlated data set. In some embodiments of the present invention, a pattern matching is used to figure out the quantitative impact for each performance anti-pattern.

Processing terminates at step S606, where a performance anti-pattern sub-system determines a performance impact for each performance anti-pattern based on a learning mode. In some embodiments of the present invention, the learning model is dynamically updated.

Figure 7:
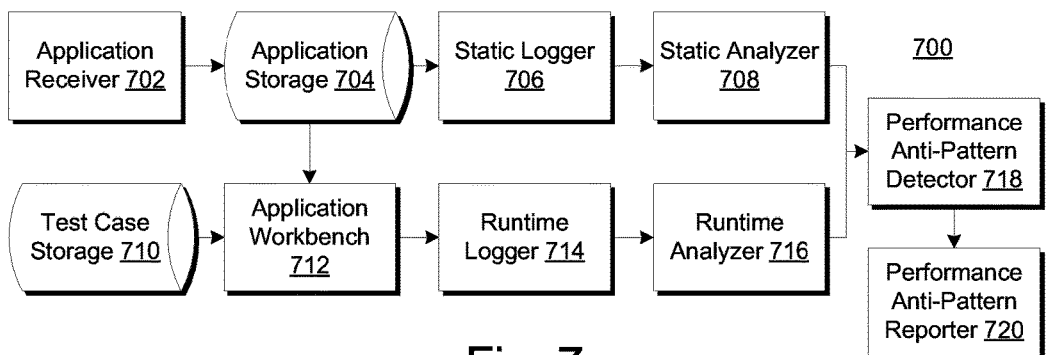
FIG. 7 is a block diagram view of a second embodiment of a system according to the present invention.

FIG. 7 shows performance anti-pattern detection environment 700. Performance anti-pattern detection environment 700 contains: application receiver 702; application storage 704; static logger 706; static analyzer 708; test case storage 710; application workbench 712; runtime logger 714; runtime analyzer 716; performance anti-pattern detector 718; and performance anti-pattern reporter 720. In this example, a performance anti-pattern detector analyzes an application code using both static and runtime analysis. Based on the detected performance anti-patterns, a report is generated. In this example, performance anti-pattern detection environment 700 also: (i) identifies a set of anti-patterns in the application where best practices are violated; (ii) identifies a set of performance issues related to the set of anti-patterns; and (iii) recommends improvements to minimize and/or eliminate the set of anti-patterns. Performance anti-pattern detection environment 700 is shown as a block diagram with many arrows. These arrows (no separate reference numerals) represent a communications fabric, which provides communications between various components of performance anti-pattern detection environment 700. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Application receiver 702 receives an application from a user or developer. In some embodiments of the present invention, application receiver 702 receives an application binary code. In some embodiments of the present invention, application receiver 702 converts an application into a corresponding application binary code. In some embodiments of the present invention, application receiver 702 retains the application in a native code.

Application storage 704 stores the application received by application receiver 702. In some embodiments of the present invention, application storage 704 stores a set of versions of a received application. In some embodiments of the present invention, application storage 704 stores an application in various formats (e.g., binary code and native code).

Static logger 706 logs a set of information about the received application based on a static environment. In some embodiments of the present invention, static logger 706 identifies a set of performance anti-pattern locations within the application binary code. Once the application binary code is executed, a set of time stamps will be recorded based on when the identified set of performance anti-pattern locations are executed.

Static analyzer 708 analyzes the received application for known anti-patterns that violate best practices. In some embodiments of the present invention, static analyzer 708 performs an analysis on the application without compiling the application.

Test case storage 710 stores a set of test cases that are known to cause runtime issues for applications. In some embodiments of the present invention, a test case includes a set of test steps. In some embodiments of the present invention, a test step is an anti-pattern. In some embodiments of the present invention, a test step performs a user interface action.

Application workbench 712 is a testing utility for automated testing of a mobile application. Testing that may be performed by application workbench 712 includes, but is not limited to: (i) regression testing; (ii) performance testing; and/or (iii) scalability testing. Application workbench 712 simulates a runtime environment to emulate an accurate workload for the application. In some embodiments of the present invention, application workbench compares the set of test cases stored in test case storage 710 to the mobile application.

Runtime logger 714 logs a set of information about the received application based on the runtime environment provided by application workbench 712. In some embodiments of the present invention, runtime logger 714 identifies a set of executed anti-patterns and a set of times at which the set of executed anti-patterns are executed. In some embodiments of the present invention, these logs are correlated to match an anti-pattern with a time.

Runtime analyzer 716 analyzes the received application for performance issues based on the runtime environment provided by application workbench 712. In some embodiments of the present invention, runtime analyzer 716 analyzes the speed and processing performance of a computer processor on which the application is being executed.

Performance anti-pattern detector 718 determines the number, types, and classifications of possible performance anti-patterns experienced by static analyzer 708 and runtime analyzer 716. In some embodiments of the present invention, static analyzer 708 and runtime analyzer 716 identify a set of matching performance anti-patterns and performance anti-pattern detector 718 bases its determination on that match. In some embodiments of the present invention, only one of static analyzer 708 and runtime analyzer 716 identifies a performance anti-pattern and performance anti-pattern detector 718 determines whether a performance anti-pattern exists.

Performance anti-pattern reporter 720 reports the set of performance anti-patterns detected by performance anti-pattern detector 718. In some embodiments of the present invention, performance anti-pattern reporter 720 creates a graphical display of the set of performance anti-patterns. In some embodiments of the present invention, performance anti-pattern reporter 720 includes metadata about the performance anti-pattern. In some embodiments of the present invention, metadata about the performance anti-pattern includes, but is not limited to: (i) a component affected by the performance anti-pattern; (ii) the name of the performance anti-pattern; (iii) a performance issue caused by the performance anti-pattern; (iv) a reason the performance anti-pattern was detected; and/or (v) a recommendation to resolve the performance anti-pattern.

Some embodiments of the present invention may include one, or more, of the following features, characteristics, and/or advantages: (i) analyzing the relative time of a performance issue with respect to the associated performance anti-pattern (on-effect, pre-effect, or post-effect); (ii) determining the quantitative performance effect of a performance anti-pattern on an application; (iii) predicting the quantitative performance effect of a performance anti-pattern on an application; (iv) adapting to new information to improve modeling; and (v) ranking performance issues based on the quantitative impact.

Some embodiments of the present invention may include one, or more, of the following features, characteristics, and/or advantages: (i) reviews and analyzes a performance report to detect performance issues; (ii) determines criticality of performance issues; (iii) ranks performance issues by importance; (iv) recommends improvements to resolve performance issues; (v) detects anti-patterns that are not optimized; (vi) detects performance anti-patterns that do not meet development standards or best practices; (vii) performs static and runtime analysis on the given application package to detect a performance anti-pattern; and (viii) outputs a performance report with a set of information, including, but not limited to, anti-patterns in the application where best practices are violated, performance issues due to violations of best practices, and/or recommendations to optimize the identified anti-patterns.

Some embodiments of the present invention may include one, or more, of the following features, characteristics, and/or advantages: (i) graphically represents performance issues; (ii) analyzes the performance of an application to indicate an impact of a performance anti-pattern; (iii) determines the criticality of an identified performance anti-pattern; (iv) adapts to improve identification of the performance impact of a performance anti-pattern; (v) correlates a quantitative performance report with a performance anti-pattern report to improve the accuracy of predictions of performance issues; and (vi) compares and correlates quantitative data with a performance anti-pattern record to determine an instance of a performance anti-pattern.

Some embodiments of the present invention may include one, or more, of the following features, characteristics, and/or advantages: (i) computes the performance impact of a performance anti-pattern based, at least in part, on data in the correlated quantitative performance report; (ii) applies pattern recognition and approximation algorithms to improve prediction accuracy; (iii) increases the confidence level of performance anti-pattern identification; (iv) determines the performance impact of a performance anti-pattern during a runtime; and (v) enables runtime ranking of performance issues due to a performance anti-pattern.

Some embodiments of the present invention may include one, or more, of the following features, characteristics, and/or advantages: (i) identifying the end-use real performance impact of various anti-patterns through crowd-sourced data correlation techniques; (ii) exposing the predicted impact of various anti-patterns as services; and/or (iii)

using the predicted performance impacts to rank the anti-patterns identified in the program.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including, but not necessarily limited to."

Receive/provide/send/input/output/report: unless otherwise explicitly specified, these words should not be taken to imply: (i) any particular degree of directness with respect to the relationship between their objects and subjects; and/or (ii) absence of intermediate components, actions, and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for improving dynamic performance ranking of mobile applications derived using predicted quantitative performance impact, the method comprising:
    identifying, by one or more processors, a set of anti-patterns in a first application binary code;
    generating, by the one or more processors, a first execution log for the set of anti-patterns during a first test execution of the first application binary code, including a set of timestamps;
    generating, by the one or more processors, a first performance report for a set of resultant impacts during execution of the first application binary code;
    determining, by the one or more processors, an association between a first anti-pattern in the set of anti-patterns and a first resultant impact in the set of resultant impacts, based on the first execution log and the first performance report, wherein the set of resultant impacts associated with the set of anti-patterns is a performance issue;
    ranking, by the one or more processors, the set of anti-patterns based, at least in part, on a subset of the set of resultant impacts;
    executing, by the one or more processors, a second test of a second application binary code to produce a second execution log and a second performance report;
    determining, by the one or more processors, a performance pattern corresponding to the first anti-pattern in the set of anti-patterns, based at least in part on the first execution log, the first performance report, the second execution log, and the second performance report;
    predicting, by the one or more processors, a resultant impact for a set of future anti-patterns, wherein the predicting recursively improves based on earlier predictions, and pattern recognition and approximation algorithms are applied to improved prediction accuracy; and
    outputting, by the one or more processors, a performance report with a set of information, wherein the set of information comprises: anti-patterns in the application where practices are violated, performance issues due to violations of the practices, and recommendations to optimize the identified anti-patterns, and resolve the performance issues based on the ranking,
    wherein:
    at least the ranking step is performed by computer software running on computer hardware.

2. The method of claim 1, further comprising:
predicting a resultant impact of the first anti-pattern identified in a third application binary code, based at least in part on the performance pattern.

3. The method of claim 1, wherein identifying the set of anti-patterns is performed as a static analysis.

4. The method of claim 1, wherein identifying the set of anti-patterns is performed as a runtime analysis.

5. The method of claim 1, further comprising:
classifying, by the one or more processors, performance patterns based at least in part on the first execution log and the first performance report, each anti-pattern in the set of anti-patterns as one of: on-effect or post-effect.

6. The method of claim 1, wherein ranking the set of anti-patterns is based on a predicted quantitative resultant impact of each anti-pattern in the set of anti-patterns.

7. The method of claim 6, wherein the predicted quantitative resultant impact is based, at least in part, on a set of crowdsourced data.

8. The method of claim 1, wherein ranking the set of anti-patterns results in a visual output.

9. The method of claim 1, wherein generating a first execution log for the set of anti-patterns during a first test execution of the first application binary code comprises at least one of: logging a set of time stamps when the set of anti-patterns are executed during test-case execution; monitoring a set of performance metrics for the application; generating a performance test report during test-case execution of an application; correlating the set of time stamps with the performance test report, such that each performance issue reported in the performance report is mapped with the identified anti-pattern; classifying the obtained correlated data as one of "on-effect," "post-effect," or "pre-effect"; determining, over multiple implementations, a set of common occurrences among the set of performance anti-patterns that indicate a relationship among a subset of the set of performance anti-patterns and that indicate a quantitative performance impact due to an interrelationship of the set of performance anti-patterns; or eliminating false positive results.

10. A computer program product for improving dynamic performance ranking of mobile applications derived using predicted quantitative performance impact, the computer program product comprising:
one or more computer readable storage medium and program instructions stored on the one or more computer readable storage medium, the stored program instructions comprising:
program instructions to identify a set of anti-patterns in a first application binary code;
program instructions to generate a first execution log for the set of anti-patterns during a first test execution of the first application binary code, including a set of timestamps;
program instructions to generate a first performance report for a set of resultant impacts during execution of the first application binary code;
program instructions to determine an association between a first anti-pattern in the set of anti-patterns and a first resultant impact in the set of resultant impacts, based at least in part on the first execution log and the first performance report, wherein the set of resultant impacts associated with the set of anti-patterns is a performance issue;
program instructions to rank the set of anti-patterns based, at least in part, on a subset of the set of resultant impacts;
program instructions to execute a second test of a second application binary code to produce a second execution log and a second performance report;
program instructions to determine a performance pattern corresponding to the first anti-pattern in the set of anti-patterns, based at least in part on the first execution log, the first performance report, the second execution log, and the second performance report;
program instructions to predict a resultant impact for a set of future anti-patterns, wherein the predicting recursively improves based on earlier predictions, and pattern recognition and approximation algorithms are applied to improved prediction accuracy; and
program instructions to output a performance report with a set of information, wherein the set of information comprises: anti-patterns in the application where practices are violated, performance issues due to violations of the practices, and recommendations to optimize the identified anti-patterns, and resolve the performance issues based on the ranking.

11. The computer program product of claim 10, further comprising:
program instructions to classify, based at least in part on the first execution log and the first performance report, each anti-pattern in the set of anti-patterns as one of: on-effect or post-effect.

12. The computer program product of claim 10, wherein the program instructions to rank the set of anti-patterns is based on a predicted quantitative resultant impact of each anti-pattern in the set of anti-patterns.

13. The computer program product of claim 12, wherein the predicted quantitative resultant impact is based, at least in part, on a set of crowdsourced data.

14. The computer program product of claim 10, further comprising:
program instructions to predict a resultant impact of the first anti-pattern identified in a third application binary code, based at least in part on the performance pattern, wherein the program instructions to rank the set of anti-patterns results in a visual output.

15. The computer program product of claim 10, wherein generating a first execution log for the set of anti-patterns during a first test execution of the first application binary code comprises at least one of: logging a set of time stamps when the set of anti-patterns are executed during test-case execution; monitoring a set of performance metrics for the application; generating a performance test report during test-case execution of an application; correlating the set of time stamps with the performance test report, such that each performance issue reported in the performance report is mapped with the identified anti-pattern; classifying the obtained correlated data as one of "on-effect," "post-effect," or "pre-effect"; determining, over multiple implementations, a set of common occurrences among the set of performance anti-patterns that indicate a relationship among a subset of the set of performance anti-patterns and that indicate a quantitative performance impact due to an interrelationship of the set of performance anti-patterns; or eliminating false positive results.

16. A computer system for improving dynamic performance ranking of mobile applications derived using predicted quantitative performance impact, the computer system comprising:
a processor set; and
a computer readable storage medium;
wherein:
the processor set is structured, located, connected, and programmed to execute instructions stored on the computer readable storage medium; and
the instructions include:
program instructions to identify a set of anti-patterns in a first application binary code;
program instructions to generate a first execution log for the set of anti-patterns during a first test execution of the first application binary code, including a set of timestamps;
program instructions to generate a first performance report for a set of resultant impacts during execution of the first application binary code;
program instructions to determine an association between a first anti-pattern in the set of anti-patterns and a first resultant impact in the set of resultant impacts, based at least in part on the first execution log and the first performance report, wherein the set of resultant impacts associated with the set of anti-patterns is a performance issue;
program instructions to rank the set of anti-patterns based, at least in part, on a subset of the set of resultant impacts;
program instructions to execute a second test of a second application binary code to produce a second execution log and a second performance report;
program instructions to determine a performance pattern corresponding to the first anti-pattern in the set of anti-patterns, based at least in part on the first execution log, the first performance report, the second execution log, and the second performance report;
program instructions to predict a resultant impact for a set of future anti-patterns, wherein the predicting recursively improves based on earlier predictions, and pattern recognition and approximation algorithms are applied to improved prediction accuracy; and program instructions to output a performance report with a set of information, wherein the set of information comprises: anti-patterns in the application where best practices are violated, performance issues due to violations of best practices, and recommendations to optimize the identified anti-patterns, and resolve performance issues based on the ranking.

17. The computer system of claim 16, further comprising:
program instructions to classify, based at least in part on the set of first execution log and the first performance report, each anti-pattern
in the set of anti-patterns as one of: on-effect or post-effect.

18. The computer system of claim 16, wherein the program instructions to rank the set of anti-patterns is based on a predicted quantitative resultant impact of each anti-pattern in the set of anti-patterns.

19. The computer system of claim 18, wherein the predicted quantitative resultant impact is based, at least in part, on a set of crowdsourced data.

20. The computer system of claim 16, further comprising:
program instructions to predict a resultant impact of the first anti-pattern identified in a third application binary code, based at least in part on the performance pattern, wherein the program instructions to rank the set of anti-patterns results in a visual output.

* * * * *